(12) United States Patent
Martin

(10) Patent No.: US 8,500,028 B2
(45) Date of Patent: Aug. 6, 2013

(54) STORED VALUE PRODUCTS, PACKAGES, THREE-DIMENSIONAL (3D) GLASSES AND METHODS RELATED THERETO

(75) Inventor: Kip Andrew Martin, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 152 days.

(21) Appl. No.: 12/889,974

(22) Filed: Sep. 24, 2010

(65) Prior Publication Data

US 2012/0074213 A1    Mar. 29, 2012

(51) Int. Cl.
*G06K 19/00* (2006.01)
*G02C 7/00* (2006.01)
*A45C 11/04* (2006.01)

(52) U.S. Cl.
USPC .......................................................... 235/487

(58) Field of Classification Search
USPC .... 351/51, 59–63, 110; 206/5; 235/487–495
See application file for complete search history.

(56) References Cited

U.S. PATENT DOCUMENTS

| | | | | |
|---|---|---|---|---|
| 69,554 A * | 10/1867 | Federhen et al. | ............... | 351/64 |
| 140,912 A * | 7/1873 | Greacen | ............... | 351/64 |
| 5,636,782 A * | 6/1997 | Moore | ............... | 229/71 |
| 6,048,061 A * | 4/2000 | Chiu | ............... | 351/63 |
| 6,048,062 A * | 4/2000 | Chow | ............... | 351/63 |
| 7,287,851 B2 * | 10/2007 | Amioka | ............... | 351/114 |
| 7,810,711 B2 * | 10/2010 | Halbur et al. | ............... | 235/375 |
| 7,832,855 B2 * | 11/2010 | Stovall | ............... | 351/156 |
| 2002/0189955 A1* | 12/2002 | Waters | ............... | 206/5 |
| 2011/0170048 A1* | 7/2011 | Shapiro | ............... | 351/56 |
| 2012/0062830 A1* | 3/2012 | Waters | ............... | 351/71 |
| 2012/0104742 A1* | 5/2012 | Scrymgeour et al. | ............... | 283/85 |
| 2012/0140163 A1* | 6/2012 | Hogan | ............... | 351/63 |
| 2012/0236404 A1* | 9/2012 | Kormandel | ............... | 359/463 |

* cited by examiner

*Primary Examiner* — Christle Marshall
(74) *Attorney, Agent, or Firm* — Ference & Associates LLC

(57) ABSTRACT

Stored value products, their packages, packaging content, displays, and associated methods for providing the same, are described. The stored value products described herein include gift cards having one or more 3D images and 3D glasses. The stored value product packing described herein include gift card package having one or more 3D images. The packaging content described herein includes collapsible 3D glasses. The displays described herein include displays having one or more 3D images and sample 3D viewers. Methods for production and use of the stored products, their packages, packaging content, and displays are also described.

20 Claims, 7 Drawing Sheets

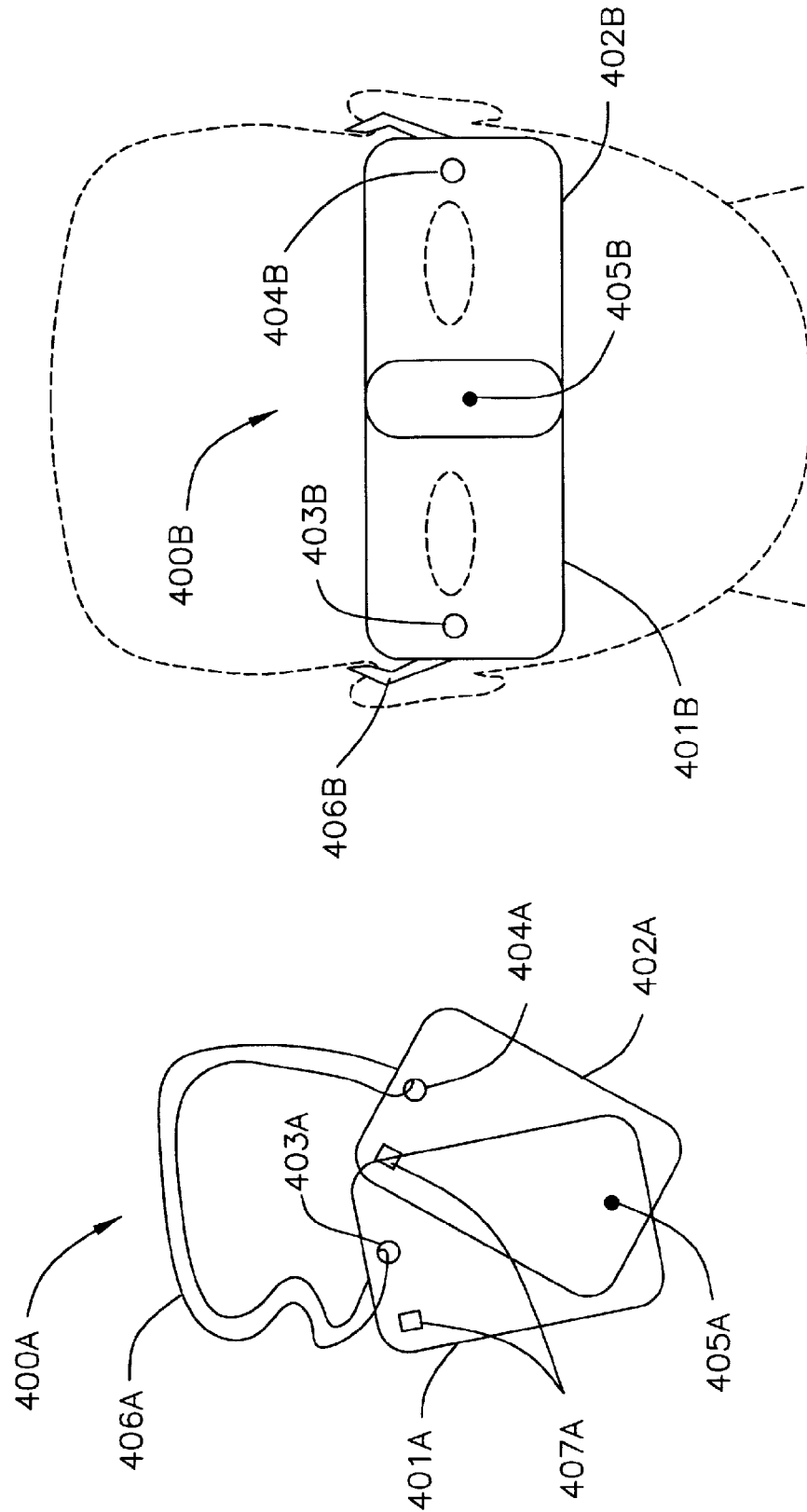

STORED VALUE PRODUCTS, PACKAGES, THREE-DIMENSIONAL (3D) GLASSES AND METHODS RELATED THERETO

FIELD OF THE INVENTION

The subject matter presented herein generally relates to stored value products, their packaging, contents and display, and production and handling thereof.

BACKGROUND

In the mid-1990s various businesses began to offer gift cards as wallet-sized cards similar in shape and size to credit or debit cards. Gift cards often employ a magnetic strip and typically have no value prior to activation, which occurs for example at the point of sale. Retailers often display gift cards at a point of sale, such as at a store counter, for customers to obtain while checking out.

Gift cards have become very popular and are often chosen over traditional gift items by customers. Businesses have adopted a variety of innovative designs for gift cards. In this regard, the appearance of gift cards has become more complex as additional retailers have entered the gift card market, with retailers applying various designs and logos, particularly to the front of the cards. Because gift cards are quite popular and numerous varieties exist, businesses continue attempts to make gift cards more attractive to customers.

SUMMARY OF THE INVENTION

The embodiments broadly contemplate providing stored value products (such as gift cards), packaging (packages), packaging content (such as three-dimensional (3D) glasses), and displays therefore, that are readily distinguishable from other stored value products, packaging, contents and displays. Moreover, certain embodiments broadly contemplate fostering a sense of community for customers by associating the stored value products with an online or virtual community. In this regard, embodiments provide stored value products having one or more 3D images, packaging having one or more 3D images, stored value products including a 3D viewer (such as 3D glasses), and stored value product displays having one or more 3D images and sample 3D viewers. The 3D images can for example correspond to 3D images associated with another product, such as 3D images of characters and the like from an online game, which are readily identifiable by customers.

In summary, one aspect provides a product comprising: pair of three-dimensional glasses comprising: a first viewing portion; a second viewing portion; and an attachment portion; wherein the first viewing portion and the second viewing portion are attached by the attachment portion such that the first viewing portion and the second viewing portion are collapsible about one another to form a compact unit and extendible about one another to form a viewing unit.

Another aspect provides a product comprising: a package, the package including a stored value product and a pair of three-dimensional glasses, the package further including one or more three-dimensional images associated with another product.

A further aspect provides a method comprising: receiving a stored value redemption request over a network, the stored value redemption request being derived from a package including a stored value product, one or more three-dimensional images, and a pair of three-dimensional glasses; providing a value associated with a product having three-dimensional images corresponding to the one or more three-dimensional images of the package to a remote device over a network responsive to receiving the stored value redemption request.

The foregoing is a summary. For a better understanding of example embodiments, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

FIG. 4(A-B) illustrates example three-dimensional glasses.

DETAILED DESCRIPTION

Figure 1:
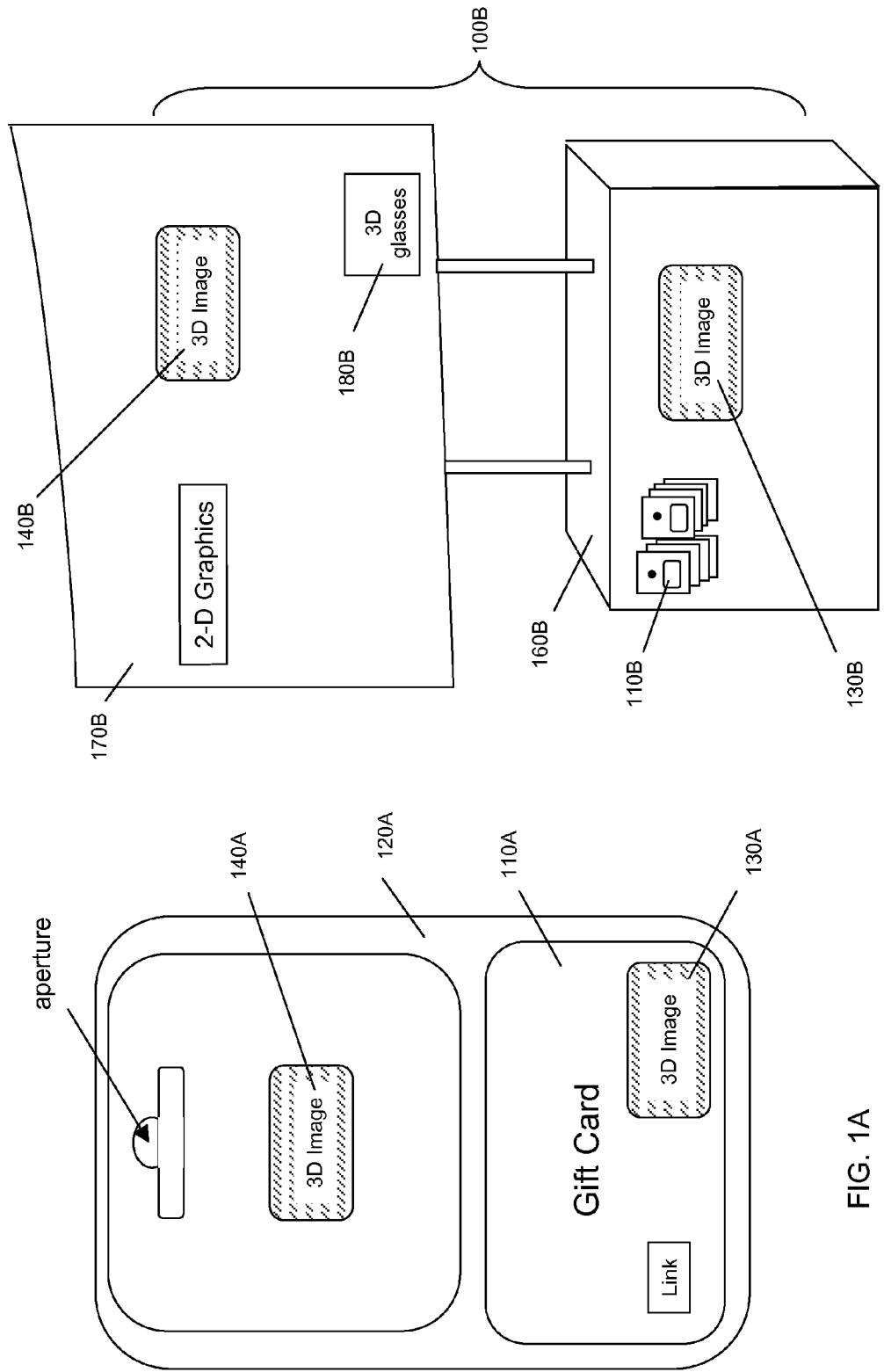
FIG. 1A illustrates an example stored value product and package.
FIG. 1B illustrates an example display.

Components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of example embodiments. Furthermore, the described features, structures, or characteristics may be combined in any suitable manner in one or more embodiments. In the following description, numerous specific details are provided to give a thorough understanding of embodiments, while other details are omitted to avoid obfuscation.

The inventor has recognized that although many different types of stored value products like gift cards have been developed, all generally fall into a few general categories. For example, essentially all gift cards are now formed into wallet-sized pieces of plastic (or like material) having therewith a link, such as a magnetic strip or a bar code, to a value record for associating the gift card with a predetermined redeemable purchasing value. Each retailer tends to print their own unique design on their particular cards using two-dimensional (2D) imaging.

However, for attracting customers more readily, the inventor has recognized what is needed are distinguishing features for stored value products, their packaging, and their displays. For example, the inventor has recognized that for customers of 3D online games, it would be beneficial to include one or more distinguishing features to allow such customers to readily identify stored value products associated with those 3D games. Thus, customers could have some interaction associated with the online community by interacting with the stored value products, packaging, and/or displays related to the 3D game.

Embodiments provide such distinguishing features for stored value products, packaging, and displays. Embodiments, in and among other features, provide distinguishing 3D images for stored value products, packaging and displays, and include 3D viewers for viewing these 3D images.

The description now turns to the figures. The illustrated example embodiments will be best understood by reference to the figures. The following description is intended only by way of example and simply illustrates certain embodiments representative of the invention, as claimed.

Referring to FIG. 1A, an example stored value product 110A is illustrated along with its package 120A (package and packaging are used interchangeably herein). In this example, the stored value product is a gift card 110A. The gift card 110A can take a variety of forms, for example a wallet-sized card made from plastic or like material and having a link to a value record for associating the gift card 110A with a predetermined redeemable purchasing value associated with another product (for example, an in-store item, an online game subscription or additional feature, an item in another store, and the like). As an example, the gift card can include a link such as a magnetic strip or a radio frequency identification (RFID) device storing such linking information, or include a printed bar code for the same purpose. As another example alternative, the gift card may take the form of a card having a scratch-off portion that when removed (outer layer scratched off) exposes a code used to unlock a stored value.

The example package 120A illustrated takes the form of a cardholder with an aperture for hanging on a display. For example, the package 120A contains the gift card 110A, which has been scored for easy removal from the package 120A, and has no outer covering. However, in contrast to conventional gift cards and/or gift card holders, the example gift card 110A includes a 3D image 130A, such as produced by a stereoscopic imaging process (described further herein). The example package 140A also contains a 3D image 140A, which may be a version of the same image 130A as that used on the gift card 110A, a related image, or the like. The example package 140 can take a variety of forms (as further described herein), such as for example a cellophane wrapping having text and/or 3D images printed thereon. The example package 140 can for example substantially or completely enclose items such as the gift card and or other materials such as a story book or flip book having one or more 3D images, a pair of 3D glasses, and the like.

FIG. 1B illustrates an example display 100B. The example display 100B includes a portion 160B for displaying gift cards 110B in their packaging and a portion 170B for displaying graphics (for example 2D images, text, advertising materials, and other associated materials). The display 100B can take a variety of configurations in addition to that shown in FIG. 1B. For example, a display may have multiple elements, such as inclusion of additional elements like posters having 3D images positioned on walls, and the like.

Preferably, the display 100B includes one or more 3D images 130B, 140B thereon. The 3D images can include for example stereoscopic images corresponding to 3D images on the gift cards 110B and/or packages. Further, the display preferably includes sample 3D viewers 180B, such as a pair of 3D glasses suitable for viewing the 3D images 130B, 140B. This provides customers with an attractive way to interact with the display 100B, and moreover provides customers with a better understanding of the uniqueness of the gift cards 110B and package features, for example, their 3D image(s).

Figure 2:
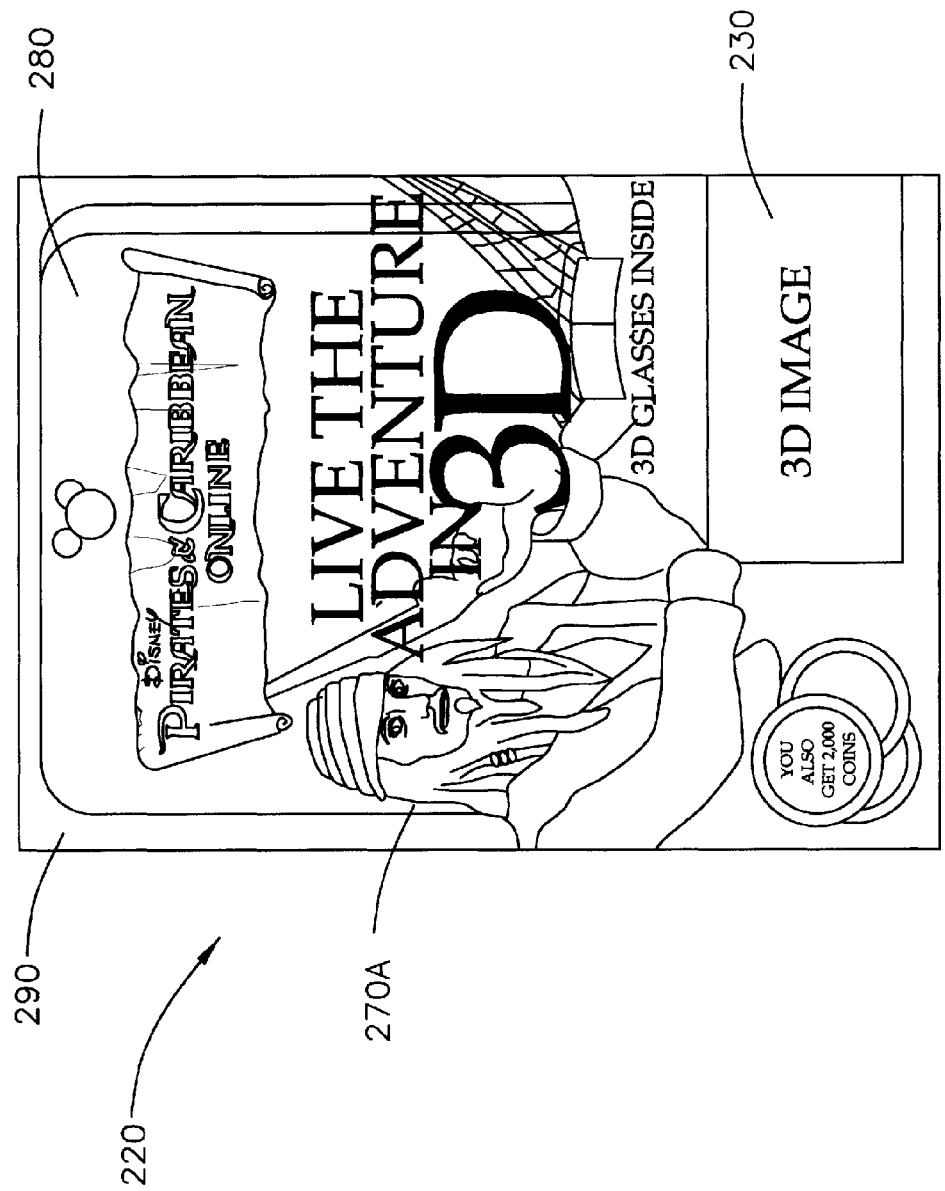
FIG. 2 illustrates an example package and contents thereof.

Referring to FIG. 2, the package 220 can take a variety of forms. An example gift card package 220 illustrated in FIG. 2 includes a clear (for example, cellophane or like material) cover or wrapper 290 having printed thereon a variety of two-dimensional (2D) graphics 270A. Additionally, the example gift card package 220 includes one or more 3D images 230 printed thereon. Use of a clear (transparent or semi-transparent) cover 290 allows customers to view the contents of the gift card package 220. In the example gift card package 220 illustrated in FIG. 2, the gift card package 220 includes a 3D viewer in the form of a compact pair of 3D glasses 280. These 3D glasses 280 enable viewing of 3D images, such as 3D image 230 and/or other 3D images contained on or in the gift card package 220 or within another product, such as a 3D game, movie, cartoon, television show, et cetera.

The stored value product can take a variety of forms. For example, gift card 110A of FIG. 1 is a wallet-sized gift card that for example includes a magnetic strip, bar code, or an RFID device for redeeming a stored value such as a reduction in purchase price. However, rather than inclusion of, or in addition to, such a traditional card, the stored value product can take other forms. For example, the stored value product can take the form of a scratch off portion that conceals a code until an outer layer is scratched off. Once the code is revealed, the code can be used in a redemption request for a stored value, such as unlocking of a game feature in an online game, providing a subscription to an online world, et cetera. Such a stored value product can be integrated into the package itself. Additionally, a 3D stored value product may be included. For example, a stored value product may be provided by printing on a portion of the packaging (or other suitable area) a code embedded in 3D graphics such that when viewed with the 3D glasses 280, the code is revealed. Thus, the 3D glasses may be utilized to view a 3D code.

Figure 3:
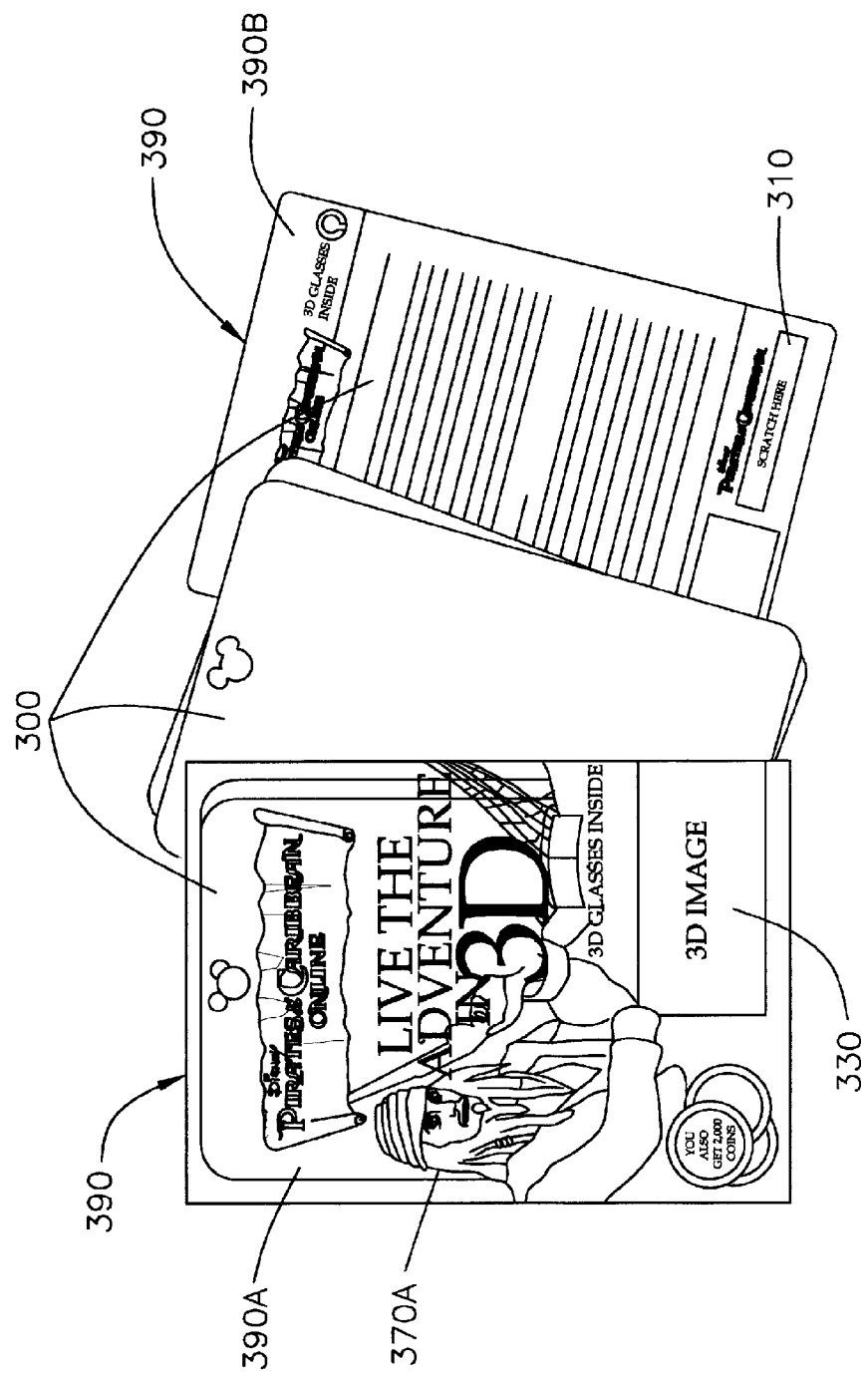
FIG. 3 illustrates an example package and contents thereof.

Referring to FIG. 3, a package and contents are illustrated. In the example package 390 illustrated in FIG. 3, which is a clear cellophane cover, a pair of 3D glasses 300 is included. The type of 3D glasses 300 is matched as appropriate for viewing the 3D image(s) 330 included on or within the package 390 or related 3D images, such as those appearing in a related game, movie or the like. The pair of 3D glasses 300 is enclosed within the package 390. The package 390 can additionally enclose other materials (not shown) such as printed materials having one or more 3D images thereon.

The front portion 390A of the package 390 includes 2D material 370A, such as graphics and/or advertising material and related information. Moreover, the front portion 390A preferably includes a 3D image 330 for viewing with the included pair of 3D glasses 300 and/or sample 3D glasses provided at the display.

The back portion 390B of the package 390 preferably includes a stored value product. In this example, the stored value product is a scratch off portion 310 integral with the back portion 390B. A customer can scratch off an outer layer in order to reveal a code, such as for entry into a 3D online game, to unlock a stored value such as an additional game feature or subscription to an online game or community. The scratch off portion 310 can be placed in a variety of locations, such as on the back portion 390B of the cover 390 as illustrated, enclosed within the package 220 (such as on a printed piece of material or a separate gift card) or the like. Additionally, a 3D stored value product could be included for revealing with the 3D glasses, as described herein.

FIG. 4(A-B) illustrates an example pair of 3D glasses. The 3D glasses 400A are preferably collapsible in order to form a compact unit for inclusion in a package (as packaging contents). FIG. 4A illustrates a view of the 3D glasses 400A in a partially collapsed configuration. The 3D glasses include viewing portions 401A, 402A that in this example are pivotally attached to one another via an attachment portion, such as a pivoting connection 405A. Other attachment portions/mechanisms, such as a sliding mechanism, are possible.

Moreover, the viewing portions 401A, 402A may be formed from one piece, such as for example having a fold line therebetween. The 3D glasses 400A further include a securing arrangement such as a lanyard 406A which attaches to or in the vicinity of right 403A and left 404A markings of the viewing portions 401A, 402A.

The 3D glasses 400A are configured such that fully collapsing the viewing portions 401A, 402A (substantially) overtop one another allows for a compact unit to be formed, which in turn allows easy inclusion in gift card package and a variety of display styles. In one example, the viewing portions 401A, 402A, when collapsed, are a thickness and a two dimensional area approximately that of a gift card/credit card. For example, the dimensions can be approximately that of a credit card as defined by the international standard (ISO/IEC 7810:2003). This specific standard indicates that credit cards be of a dimension of 85.60 millimeter by 53.98 millimeter or 3.370 inches by 2.125 inches. The thickness dimension is variable, but preferably does not exceed that of credit cards, as defined under ISO/IEC 7813,which states that each card must be 0.76 millimeters thick. Such a size is presently preferred because it allows for easy transport (such as for example inclusion in a wallet) for use at a variety of locations.

Figure 4C:
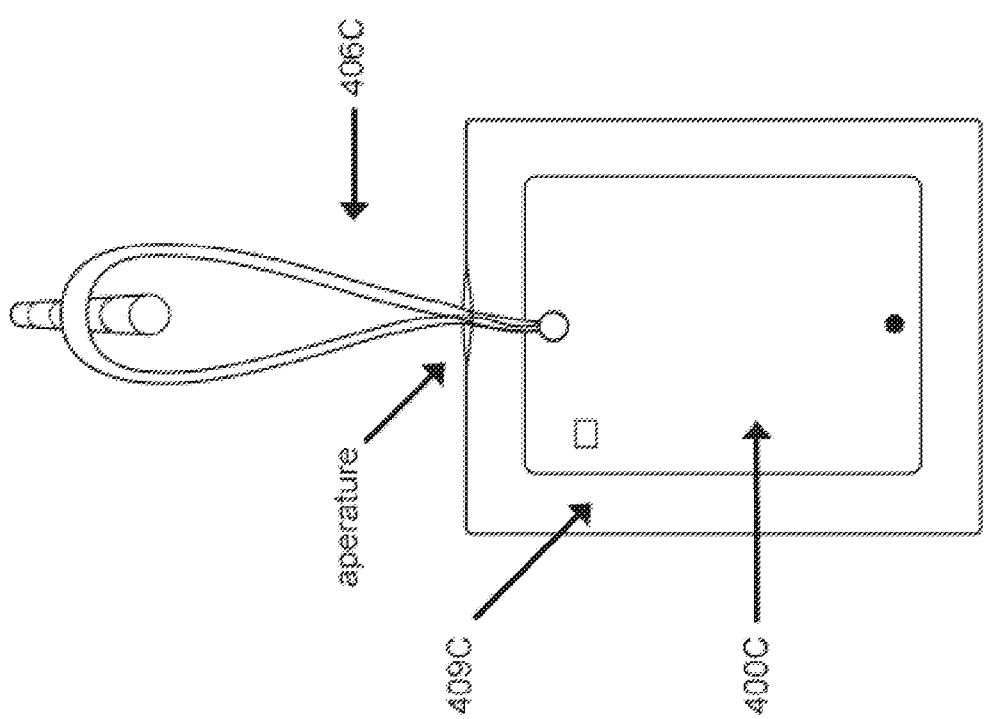
FIG. 4C illustrates an example package.

The lanyard 406A can either be tightly formed around the viewing portions 401A, 401B or exposed from a part of the package (so as to enable hanging the package by the lanyard, as illustrated in FIG. 4C). When the lanyard 406A is tightly formed around the viewing portions 401A, 401B, the lanyard will not be exposed, and thus the 3D glasses 400A can be included in a back portion of a gift card package configuration, such as that illustrated in FIG. 1A. Referring to FIG. 4C, when the lanyard 406C is not tightly formed around the viewing portions of the 3D glasses 400C, the lanyard 406C may traverse through an aperture of the package 490C and be used to hang the entire product (gift card, package, and 3D glasses) from a store display (hook).

Moreover, in the collapsed configuration, a user can wear the 3D glasses 400A around his or her neck, such as a press pass or backstage pass is worn, or around his or her wrist, such as with a bracelet, et cetera. For such wearing of the 3D glasses 400A, an attachment mechanism 407A can be included, for example having interfacing portions on each of the viewing portions 401A, 402A, that assists in keeping the viewing portions 401A, 402A stabilized (in an easily releasable manner) with respect to one another.

Referring back to FIG. 4B, illustrated is a pair of 3D glasses 400B in a fully extended configuration. In this configuration, viewing portions 401A and 401B are extended by rotating about pivoting connection 405B. The right 403B and left 404B markings assist the user in identifying the appropriate positioning of the viewing portions 401B, 402B over his or her eyes to enable viewing of stereoscopic images, for example anaglyphic images. For binocular 3D glasses, right 403B and left 404B portions have different filters, and so need to be worn appropriately for viewing. It will be readily understood by those having ordinary skill in the art that different glasses configurations and materials may be utilized depending on the type of 3D images and/or 3D imaging technology utilized.

The lanyard 406B, which can be elastic material and/or adjustable, stabilizes the 3D glasses 400B in a position over the users eyes for hands free viewing of 3D images, such as those included on gift cards, packages, materials enclosed in the package, and/or 3D images included in another product such as a 3D game, movie or television program. Thus, a user that purchases the stored value product will not have to request 3D glasses prior to playing a game that includes 3D images. The viewing portions 401B, 402B can be formed from a variety of materials, such as materials allowing binocular red/green or red/blue 3D viewing, and/or with polarizing filters, depending on the type of 3D images to be viewed, the cost deemed acceptable, and the like. Moreover, the viewing portions 401B, 402B can be formed of a flexible material or a more rigid material, depending upon factors such as user preference, comfort, stability, size, cost and the like. The viewing portions themselves can be more or less flexible, or another means (for example, a frame) can be utilized to impart more or less flexibility, as desired.

Figure 5:
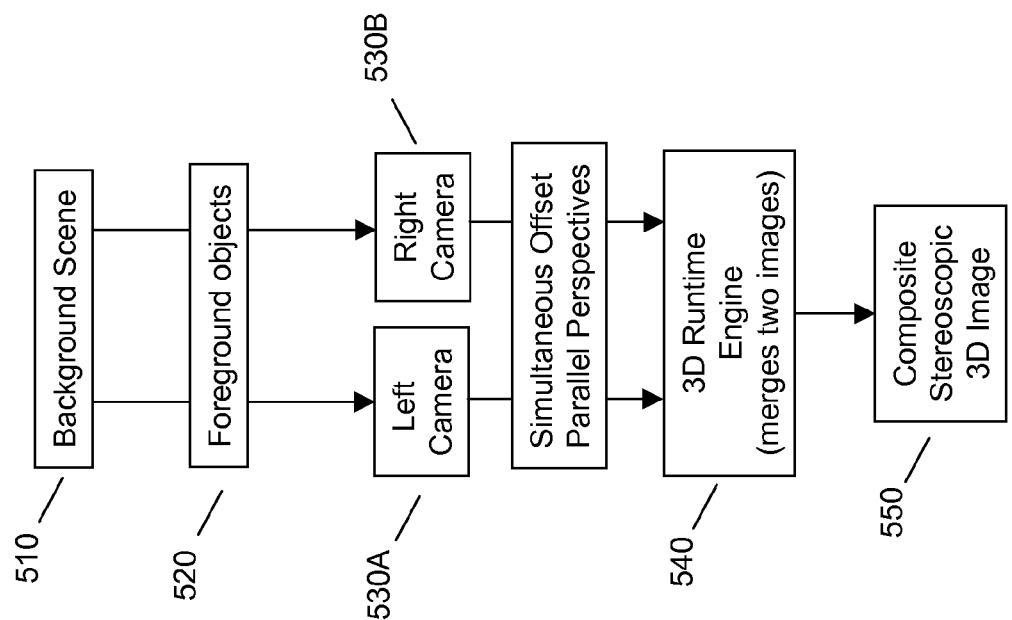
FIG. 5 illustrates an example method for providing stereoscopic three-dimensional images.

Referring now to FIG. 5, an example process for producing 3D images for inclusion with gift cards, packing and/or displays is illustrated. A background scene is captured 510, as are foreground objects 520 by left 530A and right 530B cameras. Each of the left camera 530A and the right camera 530B feed inputs, including simultaneous offset parallel perspectives (of images or portions thereof) into a 3D runtime engine 540 which merges the two images from the left camera 530A and the right camera 530B.

The 3D runtime engine produces as output a composite image 550 which can be for example a composite stereoscopic 3D image that, when printed on a stored value product, packaging or the like, can be viewed with binocular 3D glasses and appears as a 3D image to the human viewer. The composite stereoscopic 3D image can be used in a virtual gaming world, such as in an online 3D game.

As an example, left 530A and right 530B cameras can be virtual cameras within 3D virtual game world. By virtue of those virtual cameras being slightly offset (about equally offset as to the distance of a pair of left and right eyes), when displayed in simultaneous and color differentiated parallel perspectives, the 3D glasses decode the image, rendering a 3D image.

Figure 6:
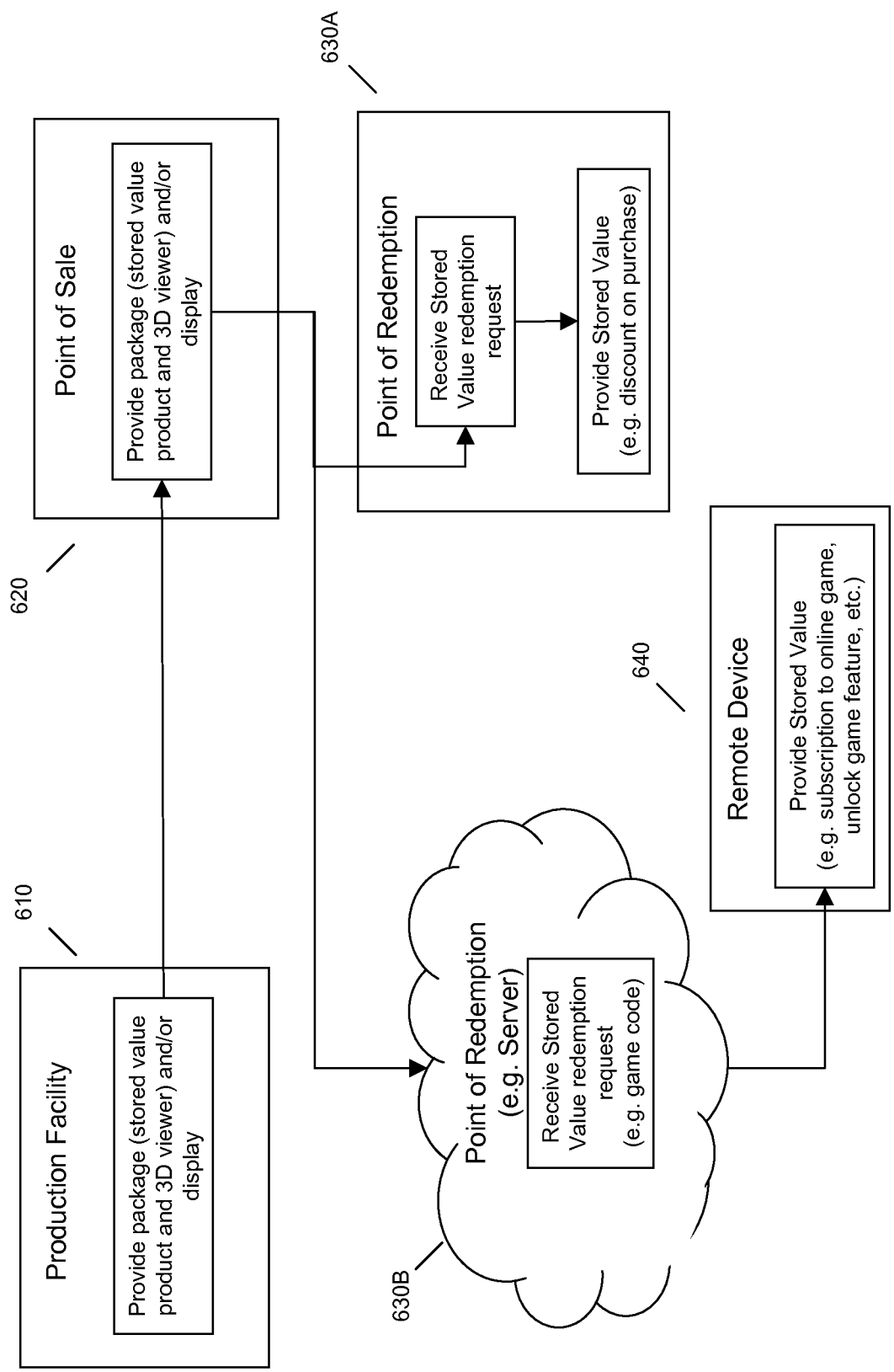
FIG. 6 illustrates an example method for producing and providing stored value products, and redemption of stored values.

FIG. 6 illustrates an example of production of stored value products and stored value redemption. A production facility 610 produces the stored value products, packages and/or displays for the stored value products. For example, the production facility can include a manufacturer that produces gift cards, packages and/or displays having 3D images incorporated therewith (for example, printed on).

The stored value products, packages, and/or displays are provided to one or more businesses that provide a point of sale 610 for these items. For example, a retailer may set up a display having one or more 3D images thereon and sample 3D viewing glasses. The display can include more than one piece or unit, such as posters having 3D images strategically placed on walls, and the like.

Included in the display are a variety of stored value products (such as gift cards) for customers to purchase. The customers can interact with the display by viewing the 3D images with sample 3D glasses provided at the point of sale. Moreover, the users can view the 3D images on the package and get a sense of the viewing opportunities available upon purchase of the gift card package (along with enclosed materials having 3D images, if any).

The stored value products further include one or more 3D images and 3D glasses for viewing the images. As above, the images of the gift cards and packages can match those of the display, as well as additional images. All the images may be coordinated about a general theme, such as an "online world", for example a 3D online game like PIRATES OF THE CARIBBEAN® online game. Thus, the 3D images of the gift cards, packages, and/or display may correspond to 3D images of characters, scenes and the like of the 3D online game.

PIRATES OF THE CARIBBEAN is a registered trademark of Disney Enterprises, Inc. in the United States and other countries.

After purchasing a gift card, a customer is enabled to redeem a stored value at a point of redemption 630A or 630B, such as a reduction in purchase price (a predetermined redeemable purchasing value) or a special game feature. For example, if the customer purchases a gift card that represents a stored value product of reduction in purchase price, the customer can enter a point of redemption 630A (which could be the point of sale 620 at which the gift card was purchased) and redeem the stored value. As another example, if the stored value product is a gift card package including a scratch off portion, the user may scratch off the outer layer of the scratch off portion and redeem a stored value at a point of redemption 630A within an online gaming world. Such a point of redemption can take the form of a web page or other online game interface at which the customer can enter the code revealed in the scratch off portion. Responsive to entry of the code at the point of redemption 630B, the online gaming world can unlock additional game features, for example provide additional awards to the online player. Such stored value may be communicated over a network such as the Internet or another network (for example WWAN 3G or 4G networks) to a remote device 640, such as a smart phone or portable wireless gaming device the customer uses to play the online game.

In addition to the example scenarios described in connection with FIG. 6, many alternative scenarios are possible. For example, a more traditional stored value such as reduction in purchase price can be redeemed at an online redemption site 630B, and communicated to a remote device 640, such as during an online shopping transaction. Conversely, a stored value such as a game code can be redeemed at a brick and mortar point of redemption 630A. Thus, a stored value product can include an item, such as a gift card or package, that represents a value associated with a traditional item, such as a subscription to another product, a reduction in purchase price for another product, an access code for another product, or the like, that when later used to redeem at a redemption point, unlocks a stored value (that is, obtains a subscription, reduces a purchase price, makes available an access code, or the like).

It should be understood that embodiments broadly provide stored value products, packaging and/or displays having one or more 3D images, and a 3D viewer such as 3D glasses. Accordingly, customers can purchase a stored value product while simultaneously obtaining necessary equipment (3D glasses) for interacting with that stored value product and other products. The displays and stored value products are designed to be more attractive to customers, for example by facilitating interactions with the displays and/or packages in stores, and offer higher value by including necessary equipment that can be utilized for a variety of out-of-store experiences where 3D viewing is desirable.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative embodiments have been described herein with reference to the accompanying drawings, it is to be understood that the embodiments are not limited to those precise embodiments, and that various other changes and modifications may be affected therein by one skilled in the art without departing from the scope or spirit of the disclosure.

What is claimed is:

1. A product comprising:
   pair of three-dimensional glasses comprising:
   a first stereoscopic viewing portion;
   a second stereoscopic viewing portion; and
   an attachment portion;
   wherein the first stereoscopic viewing portion and the second stereoscopic viewing portion are attached by the attachment portion such that the first stereoscopic viewing portion and the second stereoscopic viewing portion are collapsible via sliding about one another to overlap and form a compact unit and are extendible about one another to form a viewing unit.

2. The product according to claim 1, further comprising:
   a lanyard having a first end attached to the first stereoscopic viewing portion and a second end attached to the second stereoscopic viewing portion.

3. The product according to claim 2, further comprising:
   a package substantially enclosing the pair of three-dimensional glasses, the package including a stored value product and one or more three-dimensional images associated with another product.

4. The product according to claim 3, wherein the stored value product comprises one or more of:
   a scratch off portion integral to the package, the scratch off portion concealing a code therein redeemable for a value associated with the another product;
   a gift card having a link to a value record for associating the gift card with a predetermined redeemable purchasing value associated with the another product; and
   a three-dimensional stored value product viewable with the pair of three-dimensional glasses.

5. The product according to claim 3, wherein the lanyard extends through an aperture of the package.

6. The product according to claim 5, further comprising:
   a display comprising:
   one or more display elements for displaying the package;
   wherein the package hangs from the one or more display elements via the lanyard.

7. The product according to claim 3, wherein the another product comprises one or more of a movie product, a cartoon product, a character product, and an online game product.

8. The product according to claim 1, wherein the first stereoscopic viewing portion and the second stereoscopic viewing portion each include one of a left marking and a right marking.

9. The product according to claim 1, wherein the first stereoscopic viewing portion and the second stereoscopic viewing portion each include a securing portion; and
   wherein a securing portion of the first stereoscopic viewing portion and a securing portion of the second stereoscopic viewing portion connect to secure the first stereoscopic viewing portion in a releasable manner to the second stereoscopic viewing portion when the compact unit is formed.

10. The product according to claim 1, wherein the compact unit has a thickness approximating a credit card.

11. The product according to claim 1, wherein the first stereoscopic viewing portion and the second stereoscopic viewing portion are collapsible via sliding about one another at a pivot point to overlap.

12. A product comprising:

a package, the package including a stored value product and a pair of three-dimensional glasses, the package further including one or more three-dimensional images associated with another product;

wherein the pair of three-dimensional glasses comprise:
a first stereoscopic viewing portion;
a second stereoscopic viewing portion; and
an attachment portion;

wherein the first stereoscopic viewing portion and the second stereoscopic viewing portion are attached by the attachment portion such that the first stereoscopic viewing portion and the second stereoscopic viewing portion are collapsible via sliding about one another to overlap and form a compact unit and extendible about one another to form a viewing unit.

13. The product according to claim 12, wherein the stored value product comprises one or more of:
a scratch off portion integral to the package, the scratch off portion concealing a code therein redeemable for a value associated with the another product;
a gift card having a link to a value record for associating the gift card with a predetermined redeemable purchasing value associated with the another product; and
a three-dimensional stored value product viewable with the pair of three-dimensional glasses.

14. The product according to claim 13, wherein the gift card has one or more three-dimensional images thereon, the one or more three-dimensional images of the gift card corresponding to the one or more three-dimensional images included in the another product.

15. The product according to claim 12, wherein:
the pair of three-dimensional glasses further include a lanyard; and
the lanyard extends through an aperture of the package.

16. The product according to claim 12, wherein the first stereoscopic viewing portion and the second stereoscopic viewing portion each include one of: a left marking and a right marking.

17. A method comprising:

receiving a stored value redemption request over a network, the stored value redemption request being derived from a package including a stored value product, one or more three-dimensional images, and a pair of three-dimensional glasses, wherein the pair of three-dimensional glasses comprise: a first stereoscopic viewing portion; a second stereoscopic viewing portion; and an attachment portion; wherein the first stereoscopic viewing portion and the second stereoscopic viewing portion are attached by the attachment portion such that the first stereoscopic viewing portion and the second stereoscopic viewing portion are collapsible via sliding about one another to overlap and form a compact unit and extendible about one another to form a viewing unit;

providing a value associated with a product having three-dimensional images corresponding to the one or more three-dimensional images of the package to a remote device over a network responsive to receiving the stored value redemption request.

18. The method according to claim 17, wherein the product having three-dimensional images corresponding to the one or more three-dimensional images of the package comprises one or more of a movie product, a cartoon product, a character product, and an online game product.

19. The method according to claim 17, wherein the value associated with a product having three-dimensional images corresponding to the one or more three-dimensional images of the package is a subscription to an online game product.

20. The method according to claim 17, further comprising:
providing the package including a stored value product, one or more three-dimensional images, and a pair of three-dimensional glasses.

* * * * *